20
United States Patent Office 3,440,069
Patented Apr. 22, 1969

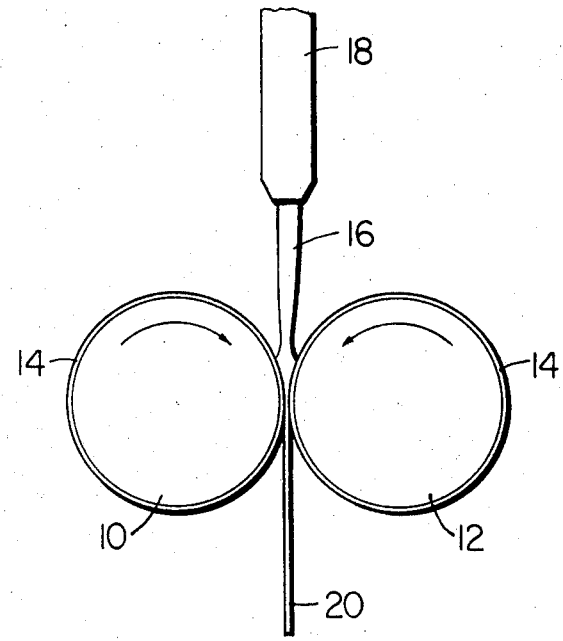

3,440,069
METHOD OF IMPROVING ROLL FORMING PROPERTIES OF MOLTEN MATERIALS
Richard E. Allen, Corning, N.Y., assignor to Corning Glass Works, Corning, N.Y., a corporation of New York
Filed Nov. 17, 1965, Ser. No. 508,265
Int. Cl. C03c *3/12, 3/30;* C03b *13/00*
U.S. Cl. 106—53                                          5 Claims

ABSTRACT OF THE DISCLOSURE

A method of improving roll forming properties of molten high dielectric constant glass ceramic materials by adding to the batch thereof an effective amount of at least 0.25 percent by weight of fluorine computed on a free fluorine basis, effective to decrease the adhesion of said materials to glass forming rollers.

---

The present invention relates to a method of improving the roll forming properties of molten high dielectric constant vitreous glass ceramic materials and more particularly to a method of reducing the adhesion of glass ceramic materials to glass forming rollers.

For the purposes of this invention the term glass ceramic is intended to include glass which can be ceramed after roll forming by proper treatment as well as other glass. A high dielectric constant, as used herein, is defined as at least 25.

In the roll forming of thin glass ceramic ribbon, such as is suitable for use as a dielectric in a stacked capacitor, it has been found that the glass ceramic ribbon sticks to the rollers, is caused to whip around the rollers, completely wraps around the rollers, becomes checked, and breaks up into small pieces. Only very small amounts of ribbon could be made and that only under transient conditions. Such problems were magnified by the fact that the ribbon is very small and thin, as for example 0.0016 inch thick and 0.225 inch wide.

It is an object of the present invention to provide an economical method of improving the roll forming properties of molten high dielectric constant glass ceramic material.

Another object of this invention is to reduce the adhesion of molten high dielectric constant glass ceramic materials to the surfaces of forming rollers.

Broadly, according to the present invention a method is provided for improving the roll forming properties of a molten vitreous high dielectric constant glass ceramic material by adding to the batch thereof an effective amount of at least 0.25 percent by weight of fluorine computed on a free fluorine basis, effective to decrease the adhesion of said material to glass forming rollers.

Additional objects, features and advantages of the present invention will become apparent to those skilled in the art, from the following detailed description and the attached drawing on which, by way of example, only the preferred embodiment of this invention is illustrated.

FIGURE 1 is an elevation view of a ribbon being roll formed in accordance with the method of the present invention.

FIGURE 2 is a flow diagram illustrating the method of the present invention.

Referring to FIGURE 1, there is shown a pair of glass forming rollers 10 and 12. Rollers 10 and 12 have a coating 14 of alumina on the rolling surfaces. A stream 16 of molten glass ceramic, to which has been added an effective amount of at least 0.25 percent by weight of fluorine computed on a free fluorine basis, is emitted from a suitable nozzle 18 to the bite between the rollers. Ribbon 20 is formed by the rollers which rotate in the direction of the arrows shown.

A batch of high dielectric constant, fluorine free glass ceramic having a viscosity of 0.5 poise and a liquidus of 1200° C. was melted in a crucible. The glass ceramic was composed by weight of 13.0 percent BaO, 9.0 percent SrO, 18.0 percent PbO, 48.0 percent $Nb_2O_5$, 7.5 percent $SiO_2$, 2.0 percent $Al_2O_3$, and 2.5 percent $B_2O_3$. In attempting to roll form a ribbon from such a composition by means of a pair of alumina clad steel rollers, it was found that the fluorine free glass ceramic readily adhered to the roller surfaces, whipped about and wrapped around the rollers in addition to checking and breaking into small pieces.

In accordance with this invention, 2.0 percent by weight of $BaF_2$ was substituted for BaO in the above described high dielectric constant fluorine free glass ceramic. When roll forming a ribbon of such fluorine containing glass ceramic, it was found that the ribbon did not adhere to the roller surfaces, rather a substantially continuous, uniform ribbon was produced.

Other examples of compositions in weight percent, to which fluorine in effective amounts of at least 0.25 percent by weight may be added, effective to decrease adhesion of such glass ceramic materials to glass forming rollers, is as follows: 11.5 to 14.1 percent BaO, 7.9 to 9.6 percent SrO, 16.0 to 19.7 percent PbO, 43.5 to 53.5 percent $Nb_2O_5$, 7.0 to 8.0 percent $SiO_2$, 2.5 to 3.5 percent $Al_2O_3$, 2.0 to 3.0 percent $B_2O_3$. In addition, these compositions have been found suitable for manufacture of high dielectric constant ribbon for capacitor dielectric purposes.

It does not appear critical how the fluorine is introduced to the glass ceramic, for example, in refining $Nb_2O_5$ fluorine may be used, and in such manufacture a fluorine residue remains. The amount of such residue may be readily controlled. It has been found that if $Nb_2O_5$ containing such fluorine residue is used as one of the constituents of the glass ceramic batch, the resulting material does not adhere to glass forming rollers and a substantially continuous, uniform ribbon may be produced, if the fluorine residue comprises an effective amount of at least 0.25 percent by weight fluorine. A suitable example of a glass ceramic material which was prepared with such a fluorine residue containing $Nb_2O_5$ is as follows in weight percent exclusive of the fluorine: 12.5 percent BaO, 8.5 percent SrO, 17.5 percent PbO, 48.5 percent $Nb_2O_5$, 7.5 percent $SiO_2$, 2.9 percent $Al_2O_3$, 2.5 percent $B_2O_3$, and 0.1 percent $Fe_2O_3$.

I claim:
1. In the method of improving the roll forming properties of a molten lead niobate glass ceramic material the step of adding an effective amount of at least 0.25 percent by weight of fluorine computed on a free fluorine basis to the batch thereof, effective to decrease adhesion of said material to alumina clad glass forming rollers.

2. A method of improving the roll forming properties of a molten high dielectric constant lead niobate glass ceramic material comprising the steps of preparing a batch of a high dielectric constant lead niobate glass ceramic material and adding to said batch an effective amount of at least 0.25 percent by weight of fluorine computed on a free fluorine basis, effective to decrease adhesion of said material to alumina clad glass forming rollers.

3. The method of claim 2 wherein the batch consists essentially by weight of between 11.5 to 14.1 percent BaO, 7.9 to 9.6 percent SrO, 16.0 to 19.7 percent PbO, 43.5 to 53.5 percent $Nb_2O_5$, 7.0 to 8.0 percent $SiO_2$, 2.5 to 3.5 percent $Al_2O_3$, and 2.0 to 3.0 percent $B_2O_3$.

4. In the method of improving the roll forming properties of a molten glass ceramic material consisting by weight essentially of 13.0 percent BaO, 9.0 percent SrO, 18.0 percent PbO, 48.0 percent $Nb_2O_5$, 7.5 percent $SiO_2$, 2.0 percent $Al_2O_3$, and 2.5 percent $B_2O_3$, the step of adding about 0.5 percent by weight of fluorine computed on a free fluorine basis to the batch thereof.

5. The method of claim 4 where said step comprises preparing batch of said glass ceramic material wherein about 2.0 percent by weight of $BaF_2$ is substituted for about 2.0 percent by weight of said BaO.

References Cited

UNITED STATES PATENTS 2,729,757  1/1956  Goodman _____ 252—62.9 X
3,248,328  4/1966  Tien et al. _____ 252—62.9

HELEN W. McCARTHY, *Primary Examiner.*

W. R. SATTERFIELD, *Assistant Examiner.*

U.S. Cl. X.R.
65—24; 106—47